US009699355B2

(12) United States Patent
Kosaka (10) Patent No.: US 9,699,355 B2
(45) Date of Patent: Jul. 4, 2017

(54) SYSTEM AND METHOD FOR SHARING DOCUMENTS AND IMAGE FORMING APPARATUSES IN GROUPS

(71) Applicant: KYOCERA Document Solutions Inc., Osaka (JP)

(72) Inventor: Naohiko Kosaka, San Ramon, CA (US)

(73) Assignee: KYOCERA Document Solutions Inc. (JP)

(*) Notice: Subject to any disclaimer, the term of this patent is extended or adjusted under 35 U.S.C. 154(b) by 0 days.

(21) Appl. No.: 14/919,610

(22) Filed: Oct. 21, 2015

(65) Prior Publication Data

US 2017/0013168 A1 Jan. 12, 2017

Related U.S. Application Data

(60) Provisional application No. 62/190,954, filed on Jul. 10, 2015.

(51) Int. Cl.
*G06F 15/00* (2006.01)
*H04N 1/44* (2006.01)
*H04N 1/00* (2006.01)
*G06F 3/12* (2006.01)

(52) U.S. Cl.
CPC ......... *H04N 1/4413* (2013.01); *G06F 3/1222* (2013.01); *G06F 3/1238* (2013.01); *G06F 3/1267* (2013.01); *H04N 1/00209* (2013.01); *H04N 1/00244* (2013.01); *H04N 2201/0094* (2013.01)

(58) Field of Classification Search
USPC ................................. 358/1.13–1.15
See application file for complete search history.

(56) References Cited

U.S. PATENT DOCUMENTS

| 2013/0222827 A1* | 8/2013 | Watanabe ............... G06F 3/122 358/1.13 |
| 2013/0222837 A1* | 8/2013 | Watanabe ............. G06F 3/1222 358/1.14 |

* cited by examiner

*Primary Examiner* — Saeid Ebrahimi Dehkord
(74) *Attorney, Agent, or Firm* — McDonnell Boehnen Hulbert & Berghoff LLP (57) ABSTRACT

The present disclosure is directed to image forming apparatuses and methods that enable the sharing of one or more documents and one or more image forming apparatuses among user devices for the task of reproducing image data. The image forming apparatus comprises a processing unit, configured to execute a group management software stored on a computer-readable medium, a network interface, and one or more accessory units configured to reproduce documents. The first method for reproducing a document includes various actions performed by an image forming apparatus within a group such that the document is reproduced via an indirect request from one user device to the image forming apparatus through a secondary user device. An alternative method for reproducing a document includes various actions performed by an image forming apparatus within a group such that the document is reproduced via a direct request from one user device to the image forming apparatus.

20 Claims, 7 Drawing Sheets

SYSTEM AND METHOD FOR SHARING DOCUMENTS AND IMAGE FORMING APPARATUSES IN GROUPS

PRIORITY

This application claims priority to U.S. Provisional Patent Application No. 62/190,954, filed on Jul. 10, 2015, the entire contents of which are incorporated by reference herein.

BACKGROUND

Unless otherwise indicated herein, the materials described in this section are not prior art to the claims in this application and are not admitted to be prior art by inclusion in this section.

Typically, when a user device requires the reproduction of a document, such as by printing or scanning the document, the user device must have a local connection to an image forming apparatus with such reproduction capabilities. Such a connection is usually a direct connection, such as a universal serial bus (USB) connection or a Bluetooth wireless connection, to the user device on which the document is stored. An alternative method involves connecting through a local area network (LAN), typically directed through a router. This can occur wirelessly, using Wi-Fi, or in a wired manner, using Ethernet cables, for example.

In many environments, however, user devices may not have direct access to an image forming apparatus to reproduce the document. Many locations, such as homes, may not have such devices as printers or scanners at all. Furthermore, in certain educational settings, user devices may not have the requisite permissions to utilize certain school or campus apparatuses to reproduce documents.

Additionally, in many settings, it may be useful to share certain documents between user devices, possibly obviating the need to reproduce them at all. Students in classrooms, for example, may need to submit homework for grading. One method to accomplish this task is for the student to print out the homework, and turn in a physical copy to the instructor. Perhaps these users (students) do not have immediate access to such a printing device to reproduce their homework document.

A utility that would allow the sharing of documents within groups, especially when coupled with the ability to print those documents at various printers shared by group members, would more efficiently utilize image forming apparatuses.

SUMMARY

The present application discloses embodiments that relate to systems and methods for group management that allow the sharing of one or more documents among user devices, as well as enable the sharing of one or more image forming apparatuses. This allows user devices to reproduce documents at an image forming apparatus within the network of another user device.

In one aspect, the present application describes an image forming apparatus. The image forming apparatus includes a processing unit that is configured to execute a group management software stored on a computer readable medium. The group management software is configured to associate subsets of members in groups comprised of image forming apparatuses and user devices. Further, the groups are configured to permit sharing one or more documents and one or more image forming apparatuses among members. The image forming apparatus also includes a network interface configured to enable communication between the image forming apparatus and one or more of the following: a repository configured to store the documents shared among the members, and one or more of the other members associated with the groups of which the image forming apparatus is a member. The image forming apparatus further comprises one or more accessory units configured to reproduce documents.

In a different aspect, the present application describes a method for reproducing a document. The method includes associating an image forming apparatus with a group, wherein the group is an associated subset of members (image forming apparatuses and user devices) defined within a group management software stored on a computer readable medium. The group is configured to permit sharing one or more documents and one or more image forming apparatuses among the members. Additionally, the group activities comprise: instantiating the group, by a first user device; associating a second user device with the group; sharing a document with the members of the group; and requesting, by a second user device, that the first user device send the document to the image forming apparatus for reproduction. The method also includes receiving the document, by the image forming apparatus. In addition, the method includes reproducing the document, by the image forming apparatus.

In a third aspect, the present application describes a method for reproducing a document. The method includes associating an image forming apparatus with a group, wherein the group is an associated subset of members (image forming apparatuses and user devices) defined within a group management software stored on a computer readable medium. The group is configured to permit sharing one or more documents and one or more image forming apparatuses among the members. Additionally, the group activities comprise: instantiating the group, by a first user device; associating a second user device with the group; sharing a document with the members of the group; and requesting, by a second user device, that the image forming apparatus reproduce the document. The method also includes receiving the document, by the image forming apparatus. In addition, the method includes reproducing the document, by the image forming apparatus.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

An example embodiment involves managing multiple user devices by providing a platform by which they can interact in subsets of user devices, herein called groups. A group management system is the mechanism by which the user devices can interact in the prescribed way, such as by sharing documents, communicating via messages, and/or sharing image forming apparatuses to perform such tasks as printing. Each user device implements an instance of a group management software to facilitate this. In order to customize and personalize this interaction, the group management software contains a group dashboard for each group in which a user device is a member. The group management software also provides a means of interacting with a cloud storage space, which acts as a repository for documents and image data during group communication.

In one embodiment, the user device may be a handheld computing device, such as a smart phone or tablet computing device. Such devices contain a display and an input device, as well as an implementation of the group management software. With these user devices, communication among user devices and with image forming apparatuses can occur.

Because of the unique combination of direct and indirect communication disclosed herein, it is possible for a user device to utilize this group management system to process image data at an image forming apparatus that is not in its immediate network. In one implementation, this is accomplished by a user device uploading a document to a cloud storage space for use by a particular group of which that user device is a member. Then, the user device selects from available image forming apparatuses through that group's dashboard. If the user device selects an apparatus that is outside of its network, it may send a request to another user device in that group that is within that apparatus' network indicating the required action to be taken with respect to a document. The secondary user device then downloads the document from the cloud storage space, performs this action for the first user device, and sends a notification indicating the completion of the task.

In an example embodiment, the above described exchange between user devices could occur within the same network for a different purpose. In an educational setting, this could provide a way for a student without network print permissions, for instance, to print a document to the classroom printer by requesting that another member of the group, such as an instructor who does have print permissions, print it instead.

Beyond just the capabilities of the system directed to the sharing of image forming apparatuses, this arrangement also secondarily serves as a collaboration tool. The group management system allows user devices to upload documents for viewing by other user devices within the group. In this way, sharing is permitted, but privacy is also maintained by only allowing those user devices designated as group members to see the content.

The group management system of the present application also can act as a file storage space for a user device. A file uploaded to a group is stored within the cloud storage space, which can serve as a file backup for later access. With additional widgets, such as a file-type distribution chart or a calendar, in one example embodiment, the group management system provides a temporary or long-term document repository for an individual user device.

II. Example Systems

Figure 1:
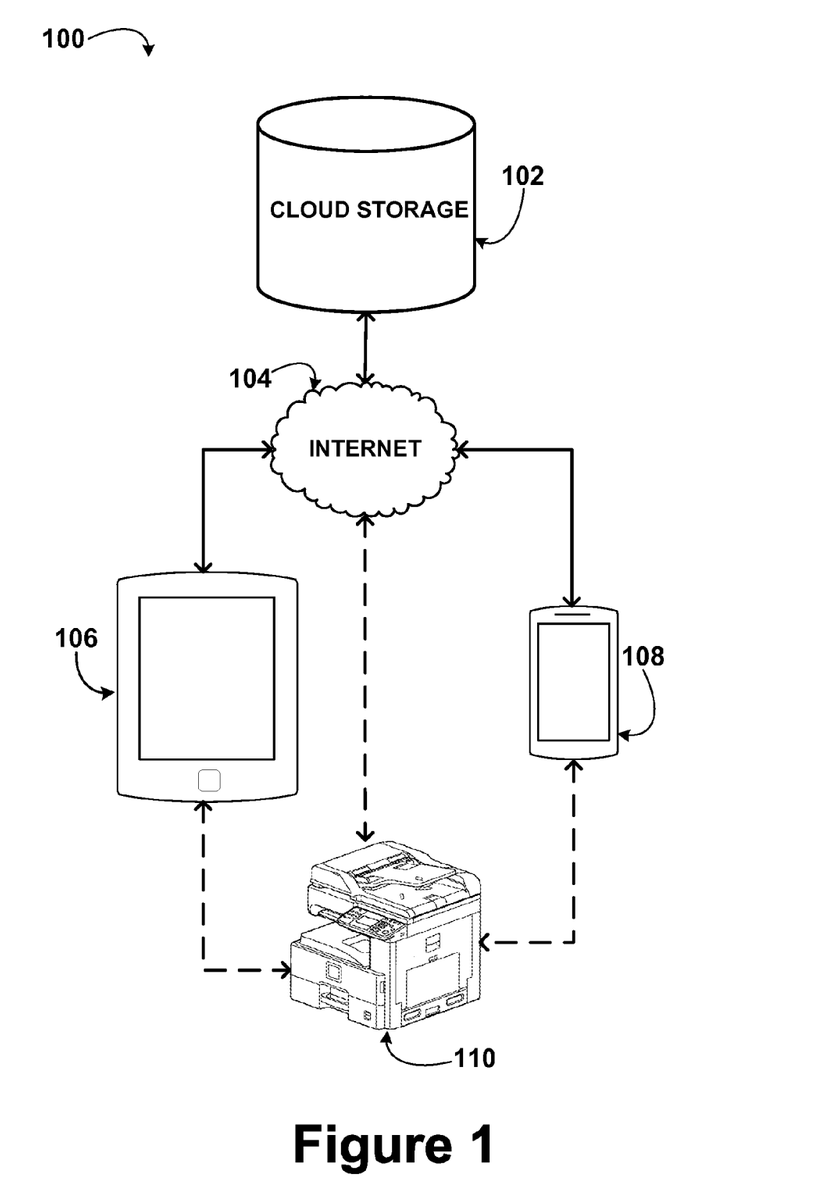
FIG. 1 is a schematic block diagram illustrating a system, according to an example embodiment.

FIG. 1 is a schematic block diagram illustrating a system 100, according to an example embodiment. The system 100 includes a cloud storage space 102, an internet 104 (such as the public Internet), a tablet computing device 106, a mobile computing device 108, and an image forming apparatus 110. The mobile computing device 108 could be a smart phone, in one example embodiment. The cloud storage space 102, the tablet computing device 106, and the mobile computing device 108 are interconnected via the internet 104. Certain devices, such as the mobile computing device 108 or the tablet computing device 106, for example, may be connected to the cloud storage space 102 via another means, such as a wide area network (WAN), in some embodiments. The image forming apparatus 110 may be interconnected to the cloud storage space 102, the tablet computing device 106, and the mobile computing device 108 via the internet 104. Furthermore, the image forming apparatus 110 may also be connected more directly to the tablet computing device 106 or the mobile computing device 108 via a local area network (LAN), for instance.

The cloud storage space 102 may be a network-accessible storage device, associated with a server, that stores document files. In some cases, the cloud storage space may be a private or commercial cloud storage service. In some implementations, requesting a document file from the cloud storage space 102 may involve transmitting a link or other reference to the remotely-stored document file, such as a document ID, to be discussed later. Such a request may also include login credentials required to authenticate the user before retrieving documents stored in the cloud storage space 102, potentially beyond those credentials required to access the group management software.

The tablet computing device 106 may be connected to the internet using a wireless connection to a LAN through a router, using Wi-Fi, for example. Additionally or alternatively, the tablet computing device 106 could be connected to an image forming apparatus 110 in this way, as well. In an alternative embodiment, the tablet computing device 106 is wirelessly connected to an image forming apparatus 110 using Bluetooth technology. In certain embodiments, it may be possible to physically dock the tablet computing device 106 directly into the image forming apparatus 110, accommodating a direct transfer of information.

The mobile computing device 108 may be connected to the image forming apparatus 110 through Bluetooth or using a wireless router, for example. It may be possible, in certain embodiments, to connect the mobile computing device 108 directly to the image forming apparatus 110 via a universal serial bus (USB) cable, or other wired connection, permitting a direct transfer of image data. The mobile computing device 108 could also use the wireless router as an access point to connect to the internet. Alternatively, it could connect to the internet wirelessly using a cellular connection.

In one embodiment, the image forming apparatus 110 is connected to the internet via an Ethernet connection to a router. In a second embodiment, there is a wireless connection between the image forming apparatus 110 and the router. In yet another embodiment, the image forming apparatus 110 is not connected to the internet, and only interacts locally with either or both of the tablet computing device 106 and the mobile computing device 108.

Figure 2:
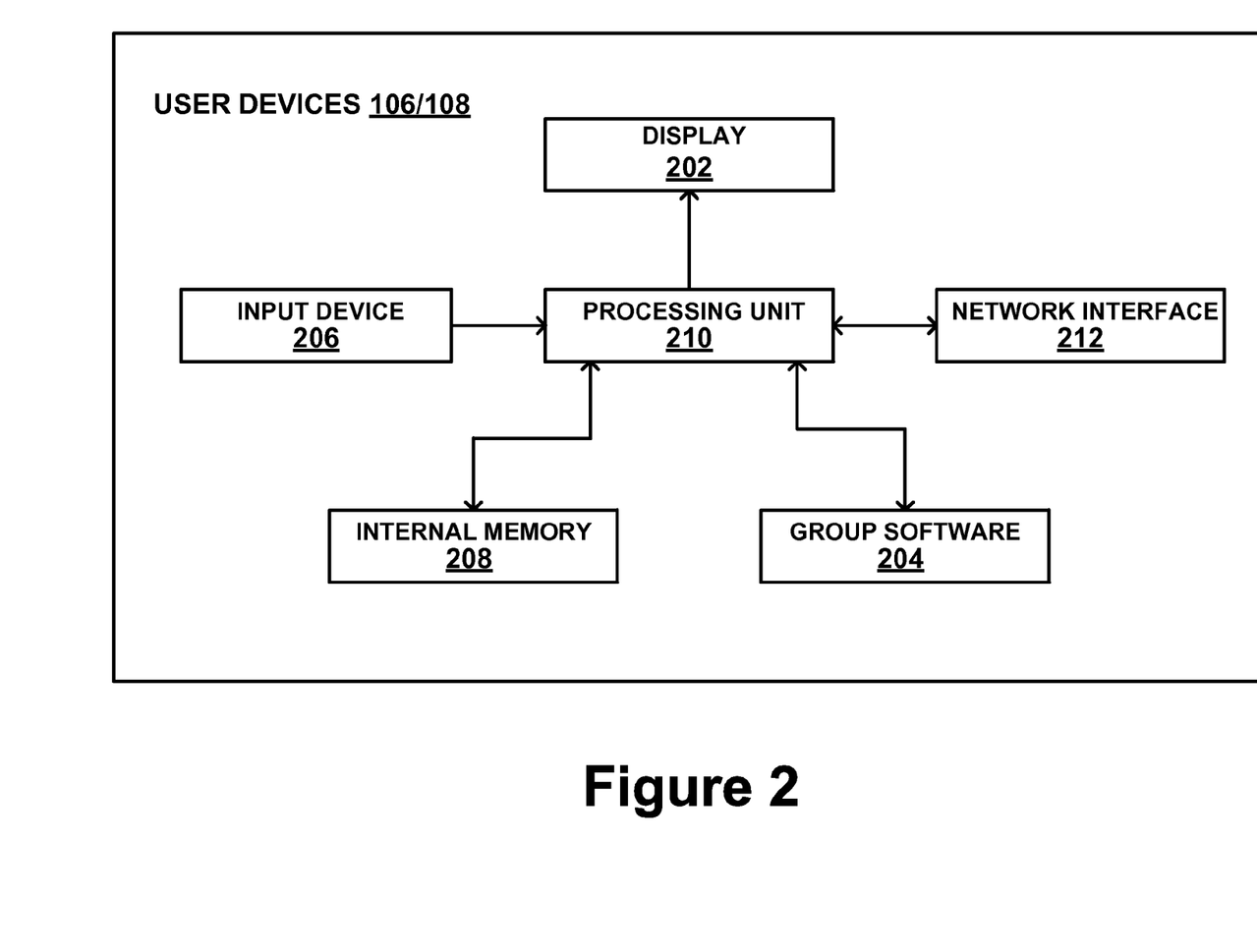
FIG. 2 is a schematic block diagram illustrating a user device, according to an example embodiment.

FIG. 2 is a schematic block diagram illustrating the tablet computing device 106 and the mobile computing device 108 as examples of user devices that may be utilized in various embodiments set forth herein. Each device would likely, but not necessarily, include a display 202, an instance of the group management software 204, an input device 206, an internal memory 208, a processing unit 210, and a network interface 212. It may also be the case that these user devices 106/108 would be equipped with a battery, allowing for mobility during use. Certain implementations of said user devices may have additional components not featured herein.

The display 202 could be implemented in a number of ways in various embodiments. Some embodiments may utilize a liquid crystal display (LCD) to provide visual feedback to a user. However, alternative technologies such as light-emitting diode (LED) displays, cathode ray tubes (CRTs), or plasma display panels (PDPs) would prove suitable in other implementations.

As can be seen from FIG. 2, the group management software 204 is directly linked with the processing unit 210. The group management software 204 is stored on a non-transitory, computer-readable medium, and executed by the processing unit 210. The software 204 is responsible for formulating messages to transmit to other user devices 106/108 or to an image forming apparatus 110, to translate messages received from other user devices 106/108, and to produce a user interface 400/500, described with respect to FIGS. 4 and 5, to display.

Some embodiments will implement the group management software 204 as an application. The application could be designed for iOS, Windows Phone, Android, or other mobile platforms. In one embodiment, the group management software 204 is written in the Objective-C language. Alternatively, one could implement the group management software 204 in a JavaScript environment. Using this language would provide a portable way to bring the group management software 204 to a browser-based device, such as a personal computing device. Other languages or environments could be used as well.

The software 204, in conjunction with the processing unit 210, incorporates many of the functionalities described herein. In one example embodiment, the software 204 has a welcome or login screen 400 and a group dashboard 500 (see FIGS. 4 and 5) for each group of which the user device is a member. The group management software 204 allows user devices 106/108 to share documents and available image forming apparatuses 110 with other user devices 106/108.

Some embodiments also include a hierarchical structure for the group management software 204. For example, in one example described herein, the creator of a group is denoted as the "instructor" or "leader". This title may provide various administrative privileges, such as the ability to exclude certain members from joining the group, remove members from the group, prevent certain members from uploading/downloading/viewing documents within a group, prevent certain members from commenting within a group, and allow only certain members to discover image forming apparatuses and add them to the group, for example.

In addition, the group management software 204 need not be as full-featured as is described herein. The group management software 204 serves as a platform on which user devices can interact to perform the requests, communications, and image reproduction tasks described in this specification. In some embodiments, the group management software 204 may be implemented as a communication protocol, in Extensible Markup Language (XML), for example, by which user devices communicate with one another.

The input device 206 is anything that may be connected or linked to the user devices 106/108 that allows a user to input commands to the device 106/108. As many of the embodiments of the tablet computing device 106 and the mobile computing device 108 will be implemented using an LCD for the display 202, it is probable that many embodiments will also utilize a touchscreen, in which a touch-sensitive surface overlays or is overlaid by the display 202 in order to achieve the input device 206. Such a touchscreen may use resistive touch, surface capacitive, projected capacitive, or infrared (IR) touch technologies, for example.

However, the input device 206 need not be a touchscreen. In some implementations, the input device may be a mouse and/or keyboard attached to the user device 106/108 via a USB cable or other wired or wireless connection. In additional embodiments, the input device 206 need not require tactile interaction. In such embodiments, a microphone could be used to accept voice commands or a camera used to read facial expressions and/or hand motions, for instance.

The internal memory 208 may be embodied in such a form as a flash memory, solid-state drive, or hard drive, allowing user devices 106/108 to locally save data, such as documents. The primary function of the internal memory 208 is to allow the storage of documents on the user device 106/108 that may be later uploaded to the cloud storage space 102 or have previously been downloaded from the cloud storage space 102. In some embodiments, the group management software 204 will also be stored in the internal memory 208.

The processing unit 210 is included in the user device 106/108 in order to execute the group management software 204 and possibly to perform other processing functions. In some embodiments, the processor is internal to the device. Commercial processing units may be implemented for this purpose, examples of which include the Apple A8 or the Cortex-A7 processors. Additionally, the processing unit 210 may issue instructions to the display 202, the internal memory 208, or the network interface 212, or may receive input from the input device 206.

The network interface 212 allows the user device 106/108 to communicate with other user devices 106/108 and/or the image forming apparatus 110. In some embodiments, the network interface 212 will allow internet connectivity wirelessly via a wireless network card, such as one that permits communication with a router that is connected to the internet using the Wi-Fi 802.11 b/g/n protocols. In other implementations, the user devices 106/108 are connected by a commercial cellular service provider, and can connect to the internet using 4G technology, for example. It is also conceivable that the user devices 106/108 have, in some embodiments, ports within the network interface 212 that allow for a direct, wired Ethernet connection to the internet.

Additionally, in some implementations, the user devices 106/108 are directly connected to the image forming apparatus 110. This could also be implemented with a wireless card within the network interface 212 that connects to a wireless router that is on the same network as the image forming apparatus 110. In other embodiments, there may be a Bluetooth connection between the user devices 106/108 and the image forming apparatus 110, or even a direct USB connection. In some embodiments, multiple of these connections could be implemented within the network interface 212 of the user devices 106/108.

Furthermore, some embodiments of the network interface 212 employ communication schema that are commensurate with current application-based user devices 106/108, such as commercially available mobile phones. In such embodiments, push notifications or transmission control protocol/user datagram protocol (TCP/UDP) over port 2195 may be used. In addition, to provide compatibility with current Internet technologies, hypertext transfer protocol (HTTP) put/get commands may be used.

Figure 3:
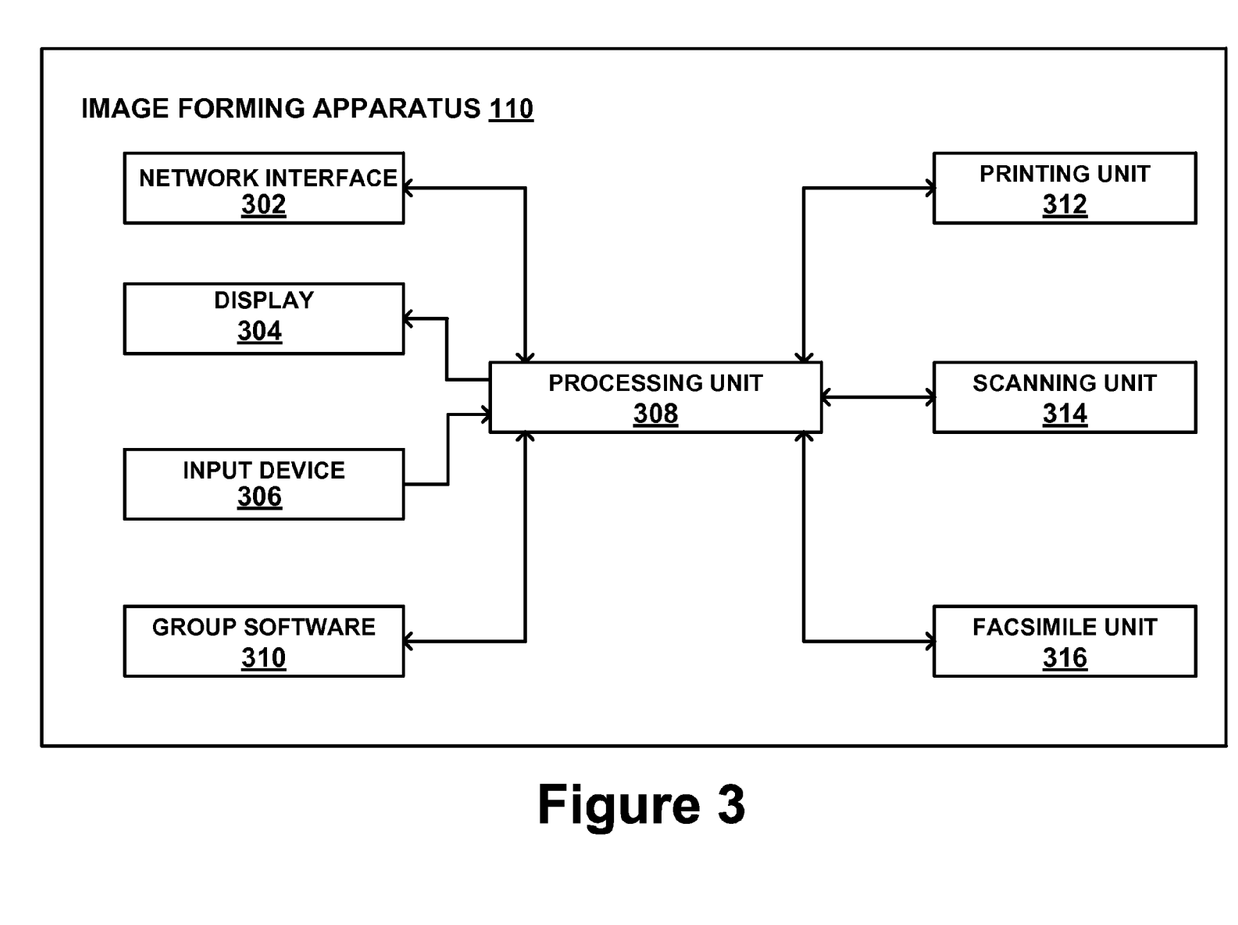
FIG. 3 is a schematic block diagram illustrating an image forming apparatus, according to an example embodiment.

FIG. 3 is a schematic block diagram illustrating an image forming apparatus 110 in an example embodiment. The image forming apparatus 110 may include a network interface 302, a display 304, an input device 306, a processing unit 308, an instance of the group management software 310, a printing unit 312, a scanning unit 314, and a facsimile unit 316. Alternative embodiments may have fewer or more accessory units, such as only a printing unit, for example. Any units that would be present within a multifunction peripheral (MFP) could be included in various embodiments of the image forming apparatus 110. Additionally, the image forming apparatus 110 may include internal memory, such as a hard drive or flash memory unit. This would allow such a unit to store image data for recall later. One reason for the inclusion of such a device would be if a user device 106/108 requested the same document for print on multiple occasions. Rather than retransmit the image data, the user device 106/108 would only need to notify the image forming apparatus 110 of the request.

As with the user devices 106/108, the network interface 302 on the image forming apparatus 110 allows interaction between the image forming apparatus 110 and user devices 106/108 and the cloud storage space 102. As was the case with the user devices 106/108, the network interface 302 can be connected to the internet 104 in a multitude of ways, including direct, wired Ethernet connection or a Wi-Fi or Ethernet connection to a router that has internet access, for example. Furthermore, certain embodiments include a personal computing device connected to the image forming apparatus 110 via a USB connection, and the personal computing device connected to the internet 104 using another mechanism. In this way, the personal computing device may act as an access portal to the internet 104, thereby functioning as a part of the network interface 302.

As discussed previously, the network interface 302 may also or alternatively incorporate an additional, more direct, connection to user devices 106/108. Again, this could be done using a USB connection, Bluetooth connectivity, a wireless connection through a LAN using a router as a medium, or even a direct docking station for the user devices 106/108.

The network interface 302, in some embodiments that include facsimile units, may also provide wired connectivity directly to a phone jack, enabling the image forming apparatus 110 to satisfy facsimile requests.

Lastly, the network interface 302 will provide, in many implementations, the ability for web-based image forming apparatus 110 discovery. Many technologies/protocols can be used to satisfy this need, including, but not limited to, the use of web services discovery, simple network management protocol (SNMP), or even commercial software for discovery, such as Apple's Bonjour software.

The display 304 of the image forming apparatus 110, besides performing user interface functions, may be used to display groups within the group management software 310 as a mobile or tablet user device display 202 would, in some embodiments. As with the display 202 on the user devices 106/108, the display 304 can be implemented using LCD, LED, CRT, or PDP technologies, for example.

In some embodiments, the input device 306 may be implemented in a similar way to the input device 206 in the user devices 106/108. Again, as with the user devices 106/108, this could be in the form of a touchscreen, utilizing such technologies as resistive touch, surface capacitive, projected capacitive, or infrared (IR) touch. In alternative designs, the input device 306 may be a keyboard/mouse connected via USB, a microphone accepting voice commands, or a camera that reads instructions based on facial expressions. Alternatively, a plurality of physical buttons may suffice for the input device 306.

The processing unit 308 in the image forming apparatus 110 is responsible for executing the group management software 310 that is stored on a non-transitory, computer-readable medium. Additionally, the processing unit 308 can perform other processing tasks within the image forming apparatus, such as communicating with the network interface 302, transmitting information to the display 304, receiving information from the input device 306, and communicating with the accessory units 312/314/316. Typically, the processing unit 308 will be a unit that is internal to the image forming apparatus 110. The processing unit 308 may be relatively simple, such as a microcontroller, or more sophisticated, such as a commercially available microprocessor or system on a chip (SoC).

It is also understood that the processing unit 308 is not necessarily limited to just a central processor, but in many embodiments could also include such components as random access memory (RAM), read only memory (ROM), or electrically erasable programmable read-only memory (EE-PROM), for example. Any entity that assists in executing the group management software 310 or in communicating with the network interface 302, the display 304, the input device 306, or the accessory units 312/314/316 may be included in the processing unit 308.

The group management software 310 allows the image forming apparatus 110 to (1) reproduce image data, when functioning as an apparatus that is added by a group leader, and/or (2) participate in group communication, when functioning as a user device within a group. The software 310 facilitates communication with user devices in groups of which the image forming apparatus 110 is a member.

It is understood that the group management software 310 in the image forming apparatus 110 may not be identical to the group management software 204 in the user devices 106/108. The group management software 310 performs similar functions and participates in the same communication network as the group management software 204 in the user devices 106/108, but, as it also has additional features and is being realized on an image forming apparatus 110, may be implemented differently. As such, it may not be written in the same language as the group management software 204 within the user devices 106/108, depending on the specific embodiment. It may, in some cases, be as primitive as assembly or machine language, sufficiently allowing the image forming apparatus 110 to reproduce those images requested by specific user devices 106/108 within a group. In some embodiments, however, it will be similar to the user device group management software 204.

An additional functionality of the group management software 310 included in the image forming apparatus 110 is to appear to user devices 106/108 either as an apparatus used for image reproduction or as an additional user device which can be interacted with, just as other user devices within a group, but which can also process image reproduction requests.

When functioning primarily as an apparatus for image reproduction, an identity attribute within the group management software 204/310 is set to "apparatus" to alert user devices that the image forming apparatus 110 is available to be added to a group in order to reproduce images, but cannot be interacted with like other user devices in the group.

Similarly, when acting as a user device that can communicate with other user devices, the identity attribute within the group management software 204/310 is set to "user", alerting user devices that the image forming apparatus 110 can join groups, post messages, and upload/download documents just as other user devices can. Additionally, however, the image forming apparatus 110 still maintains the ability to reproduce images, and may do so at the request of other user devices within the groups of which the image forming apparatus 110 is a member.

Figure 4:
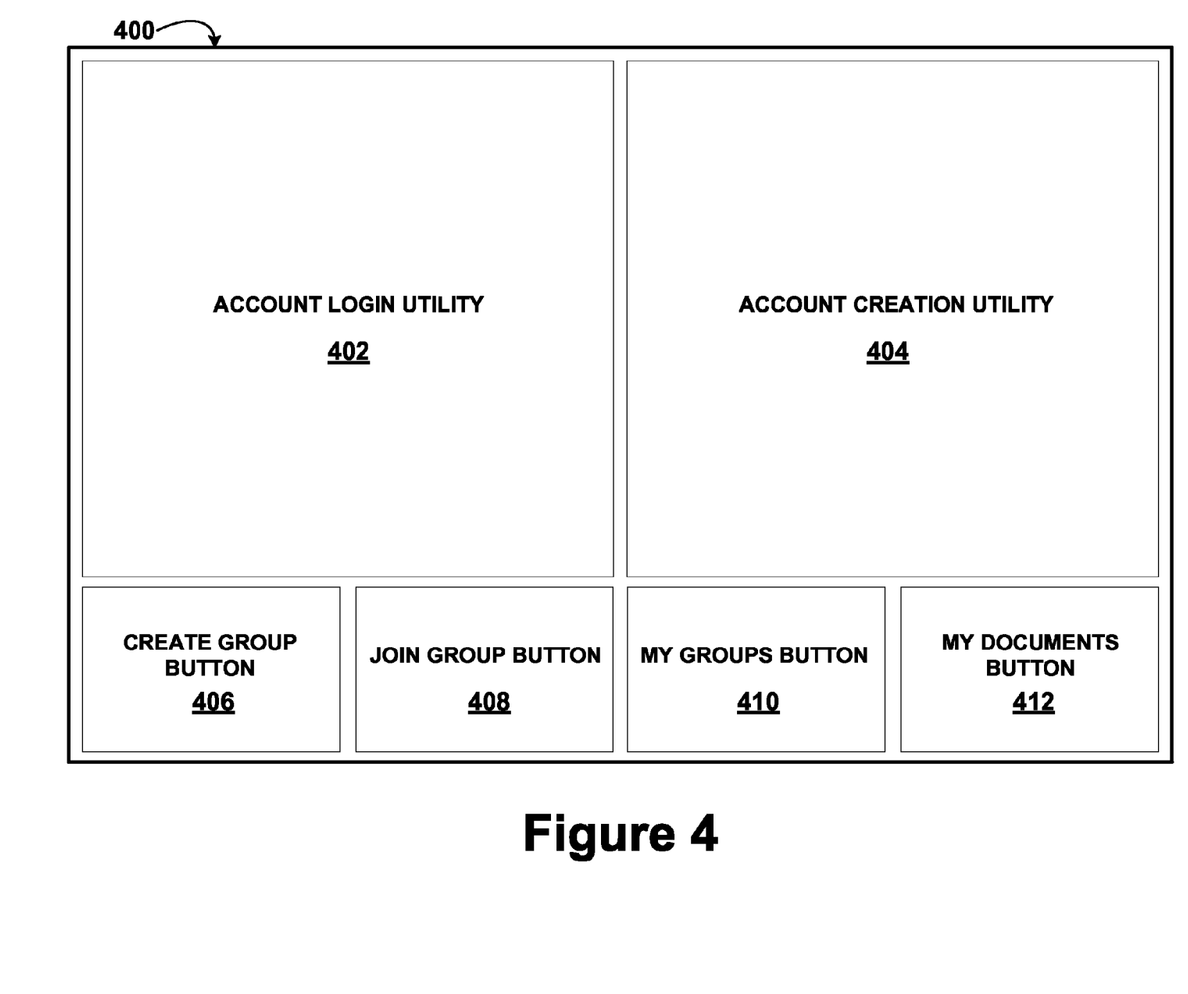
FIG. 4 is a schematic block diagram illustrating a welcome screen, according to an example embodiment.
Figure 5:
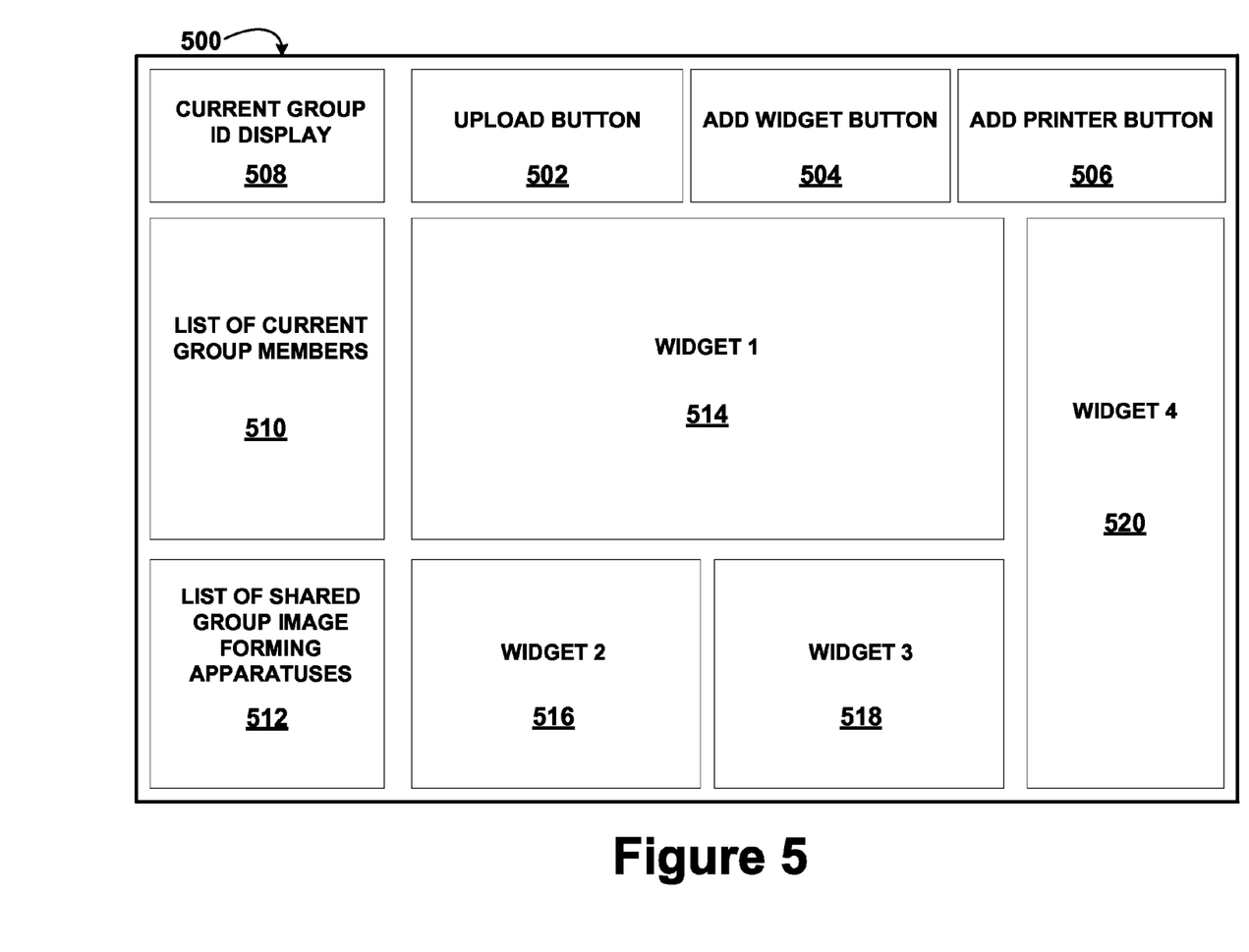
FIG. 5 is a schematic block diagram illustrating a group dashboard, according to an example embodiment.

In embodiments in which the image forming apparatus 110 behaves like a user device within the framework of the group management software 310, such software would also likely have a user interface with which a physical user could interact, example implementations of which may include such things as a welcome screen 400 or a group dashboard 500. These screens may be identical to those depicted in the group management software 204 of the user devices 106/108, but need not be. They may vary in minute ways, they may be altered substantially, or they may be absent, altogether.

The printing unit 312 is a unit present in some embodiments of the image forming apparatus 110. It communicates directly with the processing unit 308, and receives and processes image reproduction requests that take the form of printing requests. The printing unit 312 may incorporate, but is not limited to, such printing technologies as inkjet or laser, for example.

The scanning unit 314 is a unit present in some embodiments of the image forming apparatus 110. It communicates directly with the processing unit 308, and receives and processes image reproduction requests that take the form of scanning requests.

The facsimile unit 316 is a unit present in some embodiments of the image forming apparatus 110. It communicates directly with the processing unit 308, and receives and processes image reproduction requests that take the form of facsimile requests. The request may entail both the sending and receiving of facsimiles.

Furthermore, these units 312-316 may work in tandem, in certain embodiments, to process compound requests from user devices 106/108. For example, the scanning unit 314 could complete a scan of a document, that document data could be transferred to the facsimile unit 316 via the processing unit 308, and then the facsimile unit could transmit the image data to a third party. In this way, the image forming apparatus 110 could successfully complete a compound scan/facsimile request.

FIG. 4 is a schematic block diagram illustrating a user interface of a welcome screen 400 according to an example embodiment, which may be displayed by the group management software 204 within the user devices 106/108 or the group management software 310 within the image forming apparatus 110. The interface may include an account login utility 402, an account creation utility 404, a "create group" button 406, a "join group" button 408, a "my groups" button 410, and a "my documents" button 412. Other buttons and utilities may be added to this interface in other implementations. Furthermore, it is conceivable that some of the utilities and buttons in FIG. 4 be moved to alternate user interface areas within the group management software 204/310, or removed entirely. Additionally, the orientation and size within the welcome screen 400 of the buttons and utilities is, to some extent, a matter of designer preference.

The account login utility 402, in one embodiment, includes two text fields, one for username and one for an associated password, as well as a submit button that would be engaged to request that the group management software 204/310 acquires the text within the text fields. Upon validating the credentials provided by a physical user, the user is logged in. In one embodiment, this would happen by reloading the welcome screen 400, this time with an additional indicator that the user was currently logged in.

The account creation utility 404, in one embodiment, includes three text fields: one for username, one for the requested password, and one for the confirmation of the requested password, as well as a submit button that would be engaged to request that the group management software 204/310 acquires the text within the text fields. Upon checking the credentials provided to ensure the username was not previously allocated to another and that the two requested password fields matched, a message confirming successful account creation would be displayed. In this embodiment, a user could then proceed to login normally using the account login utility 402.

The create group button 406 may allow, once logged in, the creation of a new group. As discussed previously, in some embodiments, this may provide user devices with unique administrative privileges, designating them as "instructors" or "leaders". During account creation, discussed above, certain group settings could also be chosen, such as certain access levels or permission, thereby granting new accounts specific privileges. The create group button 406 may also allow the creator of a group to grant the group a unique name or number, making it easier to identify for potential group members.

The join group button 408 may provide a list of available, joinable groups. The join group button 408 would, in many embodiments, have a search function that would allow searching for specific groups, by such search fields as the creator of the group, the group number or group name, the subject matter of the group, or even the physical location of the image forming apparatuses 110 within the group.

The my groups button 410 will allow, in certain embodiments, the viewing of groups in which the user device is currently a member. It may also indicate the administrative level possessed by the user device within each group, such as "instructor" or "student", for example. Further, it could list precisely which actions a user device could take within each specified group, for more granular viewing. There may also be a utility within certain implementations that would allow a user device to leave groups of their choosing.

The my documents button 412 would display a list of the documents that the user device had previously uploaded into the cloud storage space 102. In one embodiment, the user device could add or remove documents from this list, as well as download copies of the document to its local internal memory 208. Additionally, this list may show which documents had previously been shared with specified user groups. Certain rules for specific documents, barring them from being shared with certain other groups, for example, or from being viewed/downloaded by user devices lacking specific administrative privileges, may also be set within this list, in certain embodiments.

FIG. 5 is a schematic block diagram illustrating an example user interface of a group dashboard 500 according to some embodiments, which may be seen when the group management software 204/310 is opened and the dashboard for a specific group is selected. The interface may include an "upload" button 502, an "add widget" button 504, an "add printer" button 506, a current group id display 508, a list of current group members 510, a list of shared group image forming apparatuses 512, and sections for widgets 514, 516, 518, and 520. Other buttons, utilities, and lists could be added to this interface in numerous other implementations. Furthermore, it is conceivable that some of the utilities, buttons, and lists in FIG. 5 could be moved to alternate user interface areas within the group management software 204, or removed entirely, while still preserving the intended scope of the software.

The upload button 502 opens a utility for uploading content to the cloud storage space 102 for viewing by the group. It may bring up a list of documents that were uploaded previously to the cloud storage space 102 by the user device, or, alternatively, a list of uploadable local files, and the file(s) to be uploaded to the group would be selected. In some embodiments, there may also be an area to add a text comment to include with the file, which could be viewed by other members of the group.

The add widget button 504 opens a utility for selecting or changing which widgets get inserted into the group dashboard 500 in the widget locations 514, 516, 518, and 520 for that group. In one embodiment, a list of potential widgets would be given, and the widgets could be "dragged and dropped" into various widget locations 514, 516, 518, and 520.

The add printer button 506 brings up a list of image forming apparatuses in the network that could be added to the group. The image forming apparatuses 110 to be added to the group could then be selected. In some embodiments, the software 204 may "gray-out" or remove this button if the user device does not have the requisite permissions to add printers to the group, thereby preventing that user device from doing so.

The current group id display 508, in some embodiments, indicates which group's dashboard is currently being accessed. In some implementations, this may be quite small, or non-existent altogether.

The list of current group members 510 provides a list that displays the user devices that are members of the current group. In some embodiments, it may also indicate such information as each user device's status within a group ("instructor" vs. "student", for example) or the activity of each user device, such as indicating whether they have logged in within the last 24 hours or been active within the group within the last 4 hours, for instance. It may also have additional buttons that allow those user devices with the appropriate administrative privileges to remove specific members from the group.

The list of shared group image forming apparatuses 512, in some embodiments, provides a list of image forming apparatuses 110 that have been added for use by the current group. It may also display additional information about each printer, such as its identification name/number, its physical location, its status (availability for use), and which reproduction actions it can perform (printing, scanning, or facsimile, for example).

Widgets numbered one through four 514, 516, 518, and 520 provide the ability to customize the group dashboard 500 for each group in which the user device is a member. These widgets 514, 516, 518, and 520 allow for expedited interacting/viewing within a group. Some example widgets 514, 516, 518, and 520 include a pie chart showing the percentage of documents uploaded within the group of various file types (text, video, image, etc.), a calendar, a listing of the recent activity of group members, a listing of files previously uploaded within the group, a listing of videos previously uploaded within the group, and a listing of the images previously uploaded within the group. Additionally, multiples of these widgets or none of them may be used in a given implementation. In some embodiments, these widgets can be resized and moved, and their layout in the example embodiment in FIG. 5 is in no way limiting of their potential location/size.

III. Example Methods

Figure 6:
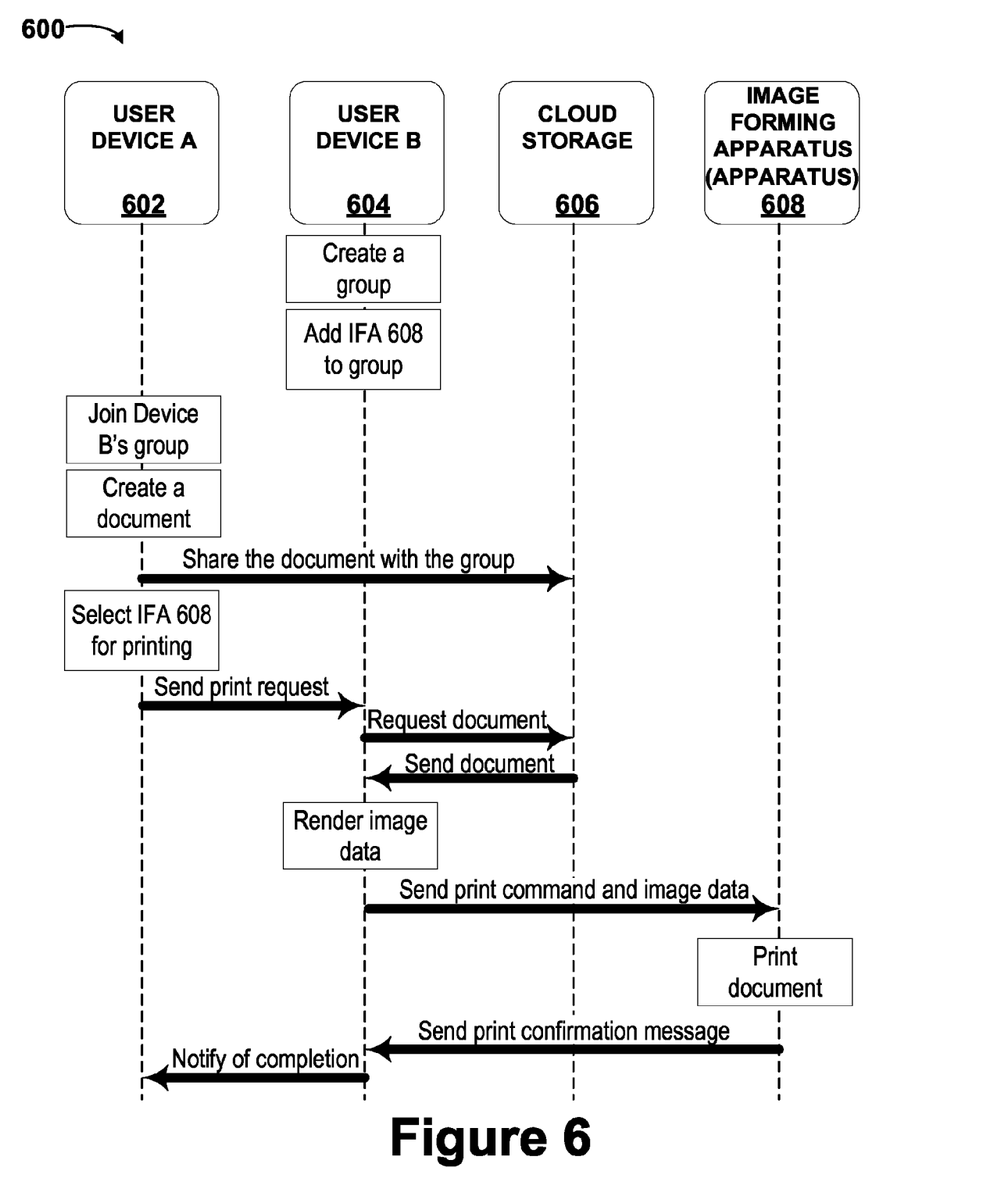
FIG. 6 is a data flow diagram illustrating a method of indirect printing, according to an example embodiment.

FIG. 6 is a data flow diagram illustrating a method 600, according to an example embodiment. The data flow diagram depicts information passing among User Device A 602, User Device B 604, cloud storage space 606, and an image forming apparatus 608. More specifically, in accordance with the method 600, the User Device A 602 ultimately prints a document on the image forming apparatus 608, which does not share a direct connection to User Device A 602. This is accomplished through the systems and methods set forth herein.

In this embodiment, the image forming apparatus 608 is acting as an apparatus with the identity attribute "apparatus", as opposed to the identity attribute "user". This is because it is functioning as a tool for processing image reproduction requests, and not as an additional user device that interacts with other group members.

Many of the following steps could be altered, rearranged, or omitted in alternate embodiments, while still retaining the primary functionality of the method. Therefore, the following is not the sole means of accomplishing the method described herein.

First, User Device B 604 creates a group by initiating an instance of the object referred to within the group management software 204 as a group (i.e. a group is instantiated). This may entail, as previously discussed, setting certain permissions, as well as identifying the group by a specific name. This may be done far in advance of User Device A 602 determining that a reproduction of an image is required.

Next, User Device B 604 adds an image forming apparatus 608 to the group. This may occur in response to a request from User Device A 602 or some other user device within the group, or it may also occur because of User Device B's 604 desire to reproduce documents from within the group. Additionally, it may be done by User Device B 604 as a preemptive measure, in case a group member in the future requires the reproduction of documents utilizing specific image forming apparatus 608.

Then, in the illustrated example, User Device A 602 joins the group. User Device A 602 may do so by browsing those groups that have image forming apparatus 608 as a usable printer, in one embodiment, or by specifically searching for the group created by User Device B 604 using the name that User Device B 604 attached to the group.

User Device A 602 then creates a document for reproduction by image forming apparatus 608. The document may be created in response to a request from User Device B 604, or, in the example of a classroom setting, as the completion of an assignment for a course in which User Device B 604 is associated with the "instructor" and User Device A 602 is associated with the "student". Furthermore, the term "create" does not exclude the addition of a previously created document to User Device A's 602 internal memory 208. User Device A 602 may be transferring a document previously saved on a USB flash drive, for instance, to the user device 106/108. Such an action may also be delineated as "creating" within the current framework of this embodiment.

After that, User Device A 602 shares the document with the entire group (or a selected subset of that group). This occurs when User Device A 602 uploads the document to the cloud storage space 606 and consequently alerts the rest of the group that the document is present. This may occur, in certain embodiments, by attaching a document ID to the document within the cloud storage space 606 and then broadcasting this document ID to the group for identification.

Then, User Device A 602 requests the printing of the document that User Device A 602 has uploaded. An image forming apparatus 110 is selected by User Device A 602 to perform the printing. In this embodiment, User Device A 602 selects image forming apparatus 608 to complete the print job.

However, in the current method, User Device A 602 is not within the network of the image forming apparatus 608, and even if it were, given that User Device A 602 is a "student" in the illustrated example, User Device A 602 does not have permission to reproduce image data using image forming apparatus 608. Therefore, User Device A 602 transmits a print request message to User Device B 604, requesting that User Device B 604 print the required document.

Then, User Device B 604, in order to fulfill the print request, retrieves the document from the cloud storage space 606. User Device B 604 can do this in the current embodiment using the document ID attached to the document by User Device A 602. User Device B 604 therefore requests the document from the cloud storage space 606, and the cloud storage space 606 (via a server) retrieves the document from its repository and delivers it to User B 604.

Before printing can occur by the image forming apparatus 608, the document is converted to image data by User Device B 608. This image data is readable by the image forming apparatus 608.

Then, User Device B 604 sends a print command to the image forming apparatus 608. This print command is accompanied by the image data that User Device B 604 is printing on behalf of User Device A 602. The image forming apparatus 608 processes this reproduction request as a printing request, and sends it to the printing unit 312 for printing. Once printed, the image forming apparatus 608 responds with a print confirmation message to User Device B 604.

After User Device B 604 has been notified that the task requested by User Device A 602 has been completed, User Device B 604 sends a message to User Device A 602 indicating that the print request to image forming apparatus 608, initiated by User Device A 602, has been successfully completed.

Figure 7:
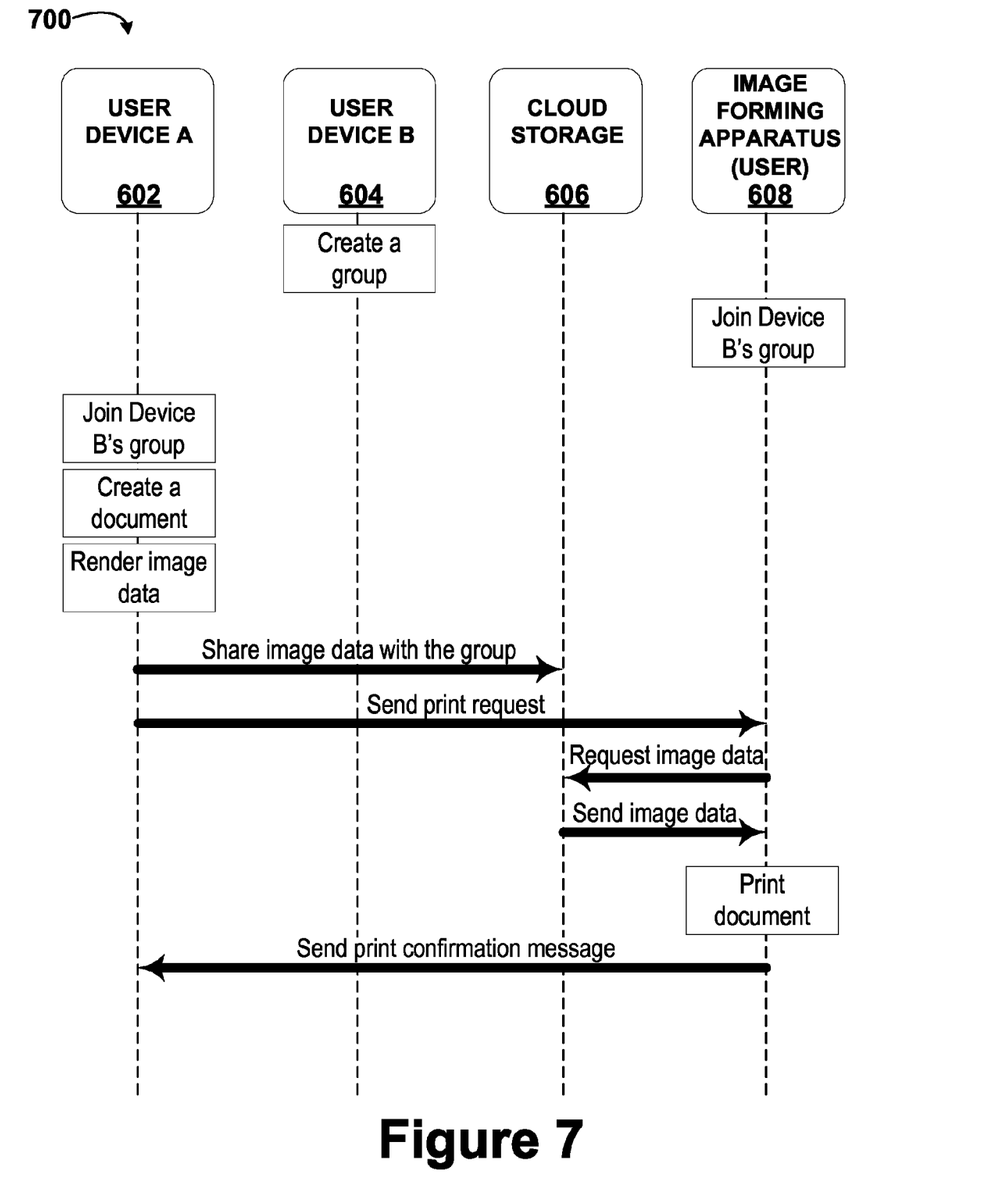
FIG. 7 is a data flow diagram illustrating a method of direct printing, according to an example embodiment.

FIG. 7 is a data flow diagram illustrating a method 700, according to an example embodiment. The data flow diagram depicts information passing among User Device A 602, cloud storage space 606, and an image forming apparatus 608. More specifically, the data flow diagram depicts a process by which User Device A 602 prints a document on the image forming apparatus 608.

In this particular embodiment, the image forming apparatus 608 is being used as a device with the identity attribute "user", meaning it is participating in the group interaction as, itself, a user device. This negates the requirement for an additional user device, User Device B 604 for example, to be within the network of the image forming apparatus 608 in order to aid in the completion of the printing task.

Many of the following steps could be altered, rearranged, or omitted in alternate embodiments, while still retaining the primary functionality of the method. Therefore, the following is not the sole means of accomplishing the method described herein.

First, User Device B 604 creates a group by initiating an instance of the object referred to within the group management software 204 as a group (i.e. a group is instantiated). This may entail, as previously discussed, setting certain permissions as well as identifying the group with a specific name. Again, this may be done far in advance of User Device A 602 determining that a reproduction of an image is required.

Then, the image forming apparatus 608 and User Device A 602 join the group. In some embodiments, this may be done by searching for the group created by User Device B 604 using the name that User Device B 604 attached to the group. The order in which the image forming apparatus 608 and User Device A 602 join the group does not matter. It may occur in the inverse order in other embodiments. It may be more likely to occur as illustrated, however, if User Device A 602 desires to join a group in which the image forming apparatus 608 is already a member.

User Device A 602 then creates the document for reproduction by the image forming apparatus 608. Again, the term "create" does not preclude the addition of a previously created document to User Device A's 602 internal memory 208.

Then, User Device A 602 renders the document to image data for printing.

Next, in order to share the document with the image forming apparatus 608, User Device A 602 uploads the document image data to the cloud storage space 606. User Device A 602 attaches (associates) a document ID to the document, making it easier for other user devices to find and print in the future. User Device A 602 also broadcasts this document ID to the rest of the group.

Then, User Device A 602 transmits a print request to the image forming apparatus 608. This print request may contain a link to the location of the document image data within the cloud storage space 606, or perhaps the document ID so that the image forming apparatus 608 can quickly find the document image data within the cloud storage space 606. The image forming apparatus 608 processes this reproduction request as a printing request, but before it can accommodate such a request, the document image data is retrieved.

To retrieve this data, the image forming apparatus 608 requests the document image data from within the cloud storage space 606, either using the document ID or a link to the location of the document image data. Using this information, the cloud storage space 606 locates the document image data (via a server) and transmits it to the image forming apparatus 608.

Lastly, the image forming apparatus 608 prints the document, as requested by User Device A 602, and sends User Device A 602 a message notifying of the printing.

Even though the image forming apparatus 608 printed the document in this embodiment, the image forming apparatus 608 functioned as a user device, similar to User Device A 602 or User Device B 604. As a user device, it could send and receive messages via the internet in order to communicate with User Device A 602 and interact with the cloud storage space 606 via the internet to retrieve the document image data directly, thereby allowing User Device A 602 to utilize the image forming apparatus 608 as a printer, even if the image forming apparatus 608 were not in the network of User Device A 602.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed is:

1. An image forming apparatus, comprising:
    a processing unit, wherein the processing unit is configured to execute a group management software, wherein the group management software is stored on a non-transitory computer-readable storage medium and the group management software is configured to associate subsets of one or more members in one or more groups, wherein the one or more members are image forming apparatuses or user devices, wherein the one or more groups are configured to permit sharing one or more documents and one or more image forming apparatuses among the one or more members;
    a network interface, wherein the network interface is configured to enable communication between the image forming apparatus and one or both of the following:
        a repository, wherein the repository is configured to store the documents shared among the one or more members; and
        one or more of the other members associated with the groups of which the image forming apparatus is a member; and
    one or more accessory units, wherein the accessory units are configured to reproduce documents,
    wherein the user devices include a first user device and a second user device,
    wherein the first user device is permitted to print on the image forming apparatus and the image forming apparatus lacks a direct connection to the second user device,
    wherein the second user device requests a print request of the documents to the first user device, and
    wherein the first user device accesses the repository, retrieves the stored documents, and sends the documents to the image forming apparatus.

2. The image forming apparatus of claim 1, further comprising:
    a display, wherein the display is configured to provide feedback to a user of the image forming apparatus.

3. The image forming apparatus of claim 1, further comprising:
    an input device, wherein the input device is configured to accept input from a user of the image forming apparatus and provide the input to the processing unit.

4. The image forming apparatus of claim 1, wherein the accessory unit is a printing unit.

5. The image forming apparatus of claim 1, wherein the accessory unit is a scanning unit.

6. The image forming apparatus of claim 1, wherein the accessory unit is a facsimile unit.

7. The image forming apparatus of claim 1, wherein the repository is a cloud storage space.

8. The image forming apparatus of claim 1, wherein the image forming apparatus has an identity attribute associated with the group management software, and wherein the identity attribute denotes whether the image forming apparatus is participating as a user device within the group or as a shared image forming apparatus within the group.

9. A method for reproducing a document, comprising:
    associating an image forming apparatus with a group, wherein the group is an associated subset of one or more members defined within a group management software, wherein the group management software is stored on a non-transitory computer-readable storage medium configured to be executed by a processing unit, wherein the one or more members are image forming apparatuses or user devices, wherein the group is configured to permit sharing one or more documents and one or more image forming apparatuses among the one or more members, and further wherein a set of activities occurring within the group comprises:
    instantiating the group by a first user device;
    associating a second user device with the group;
    sharing a document with the one or more members of the group; and
    requesting, by the second user device, that the first user device send the document to the image forming apparatus for reproduction, wherein the second user device lacks a direct connection to the image forming apparatus;
    receiving the document, by the image forming apparatus; and
    reproducing the document, by the image forming apparatus.

10. The method of claim 9, wherein the sharing of the document with the one or more members of the group further comprises:
    uploading the document to a repository;
    associating a document identification (ID) with the document; and
    transmitting the document ID to other user devices in the group.

11. The method of claim 9, wherein the reproducing of the document further comprises printing the document.

12. The method of claim 9, wherein the reproducing of the document further comprises scanning the document.

13. The method of claim 9, wherein the reproducing of the document further comprises faxing the document.

14. The method of claim 9, wherein associating the image forming apparatus with the group further comprises denoting that the image forming apparatus is participating as a shared image forming apparatus within the group by associating the image forming apparatus with an appropriate identity attribute associated with the group management software.

15. The method of claim 9, wherein the second user device is not within the network of the image forming apparatus.

16. The method of claim 9, wherein the second user device lacks permission to reproduce the documents using the image forming apparatus.

17. A system for reproducing a document, comprising a first user device, a second user device, an image forming apparatus, a repository, and one or more processors, wherein the processor is configured to:
associate the image forming apparatus with a group, wherein the group is an associated subset of one or more members defined within a group management software, wherein the group management software is stored on a non-transitory computer-readable storage medium configured to be executed by the processor, wherein the one or more members are the image forming apparatuses, the first user device, and the second user device, wherein the second user device lacks a direct connection to the image forming apparatus, wherein the group is configured to permit sharing one or more documents and one or more image forming apparatuses among the one or more members, and further wherein a set of activities occurring within the group comprises:
instantiating the group by the first user device;
associating the second user device with the group;
storing a document in the repository;
sharing the document with the one or more members of the group; and
requesting, by the second user device, that the first user device send the document to the image forming apparatus for reproduction;
receiving the document, by the image forming apparatus; and
reproducing the document, by the image forming apparatus.

18. The system of claim 17 wherein the sharing of the document with the one or more members of the group further comprises:
uploading the document to a repository;
associating a document identification (ID) with the document; and
transmitting the document ID to other user devices in the group.

19. The system of claim 17, wherein the reproducing of the document further comprises at least one of printing the document, scanning the document, and faxing the document.

20. The system of claim 17, wherein associating the image forming apparatus with the group further comprises denoting that the image forming apparatus is participating as a user device within the group by associating the image forming apparatus with an appropriate identity attribute associated with the group management software.

* * * * *